United States Patent
Chang

(10) Patent No.: US 7,542,310 B2
(45) Date of Patent: Jun. 2, 2009

(54) SYNCHRONOUS RECTIFICATION CONTROL CIRCUIT

(75) Inventor: Yu-Yuan Chang, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 224 days.

(21) Appl. No.: 11/797,305

(22) Filed: May 2, 2007

(65) Prior Publication Data
US 2008/0273359 A1 Nov. 6, 2008

(51) Int. Cl.
*H02M 3/335* (2006.01)
(52) U.S. Cl. .................. 363/21.06; 363/21.05
(58) Field of Classification Search ........... 363/20, 363/21.01, 21.04, 21.05, 21.06, 21.07, 21.1, 363/21.13, 21.14, 21.15, 21.18
See application file for complete search history.

(56) References Cited
U.S. PATENT DOCUMENTS

| | | | | |
|---|---|---|---|---|
| 5,708,571 A | * | 1/1998 | Shinada | 363/16 |
| 5,734,563 A | * | 3/1998 | Shinada | 363/21.06 |
| 6,674,658 B2 | * | 1/2004 | Mao et al. | 363/127 |
| 6,765,810 B2 | * | 7/2004 | Perry | 363/21.06 |
| 7,304,868 B2 | * | 12/2007 | Aso et al. | 363/21.06 |

* cited by examiner

*Primary Examiner*—Matthew V Nguyen
(74) *Attorney, Agent, or Firm*—Muncy, Geissler, Olds & Lowe, PLLC

(57) ABSTRACT

The present invention discloses a synchronous rectification control circuit, comprising at least one switch unit, a pulse width control unit, a transformer, a first rectification unit, a second rectification unit, a plurality of driving units, a logic operation unit and a signal transmission unit. The logic operation unit is used for receiving a working cycle signal generated by the pulse width control unit. When the working cycle signal is changed, the signal transmission unit transmits a switching signal for changing the working conditions of the first and second rectification units at a secondary side of the transformer, so as to switch the first and second rectification units before the switch unit operates and prevent possible short circuits or overlaps.

4 Claims, 3 Drawing Sheets

SYNCHRONOUS RECTIFICATION CONTROL CIRCUIT

FIELD OF THE INVENTION

The present invention relates to a synchronous rectification control circuit, and more particularly to a control circuit that drives a rectification unit of a secondary side of a transformer in a rectification circuit to operate with a primary side of a power driving unit for a synchronous rectification.

BACKGROUND OF THE INVENTION

The output of a general power supply needs to rectify AC current to produce a stable DC current. To achieve the aforementioned objective, a basic structure should include at least one output switch unit, a transformer and a rear-end rectification unit to control the direction of AC current passing through a primary winding of a transformer to produce exciting cycles and demagnetizing cycles of the transformer. The secondary side winding of the transformer produces AC current with a voltage change, and finally the rectification unit converts the current into AC power, and supplies the voltage required for the operation of an electronic device. In an electric power conversion, the timing of the rectification unit is asynchronous with the timing of the output switch unit, and thus causing short circuits or unnecessary consumptions of power. A rectification unit in a conventional circuit is asynchronous, since it does not know the timing of the output switch unit. Referring to FIG. 1 for the basic structure of a conventional synchronous rectification converter, an output switch unit 3 at the front end of a transformer 4 includes a first output switch 31 and a second output switch 32, and the rectification unit 6 includes a first rectifier 61 and a second rectifier 62, and the working cycle of the first and second output switches 31, 32 is controlled by a pulse width control unit 1 to change the current passing through the transformer 4. The rear end of the transformer 4 detects a direction change of current at a secondary side of the transformer 4 by a plurality of detection circuits 5, so as to drive a plurality of rectification driving units 21 to change the operation conditions of the first and second rectifiers 61 respectively. The first output switch 31, the first rectifier 61, the second output switch 32 and the second rectifier 62 are turned ON or OFF simultaneously. However, the first output switch 31 which is turned ON in an operation has no way of knowing whether or not the second rectifier 62 is turned OFF before the first output switch 31 is turned ON. If the first output switch 31 is turned ON and the second rectifier 62 is turned OFF, then an excessively large current will pass through the first rectifier 61 and the second rectifier 62, until the second rectifier 62 is turned OFF. Now, the secondary side of the transformer 4 will produce a very large surge, which will damage the first and second rectifiers 61, 62, and thus it is necessary to enhance the timing and linking relation between the output switch unit and the rectification unit, so as to avoid abnormal currents produced in the electric power conversion, damages to components, or unnecessary consumptions of excessively large power.

SUMMARY OF THE INVENTION

In view of the shortcomings of the foregoing conventional circuits that is asynchronous with circuit components and causes damages and losses, the primary objective of the present invention is to provide a rectification unit at the secondary side of the transformer that can avoid the timing of turning on a primary side output switch unit before changing the working conditions, so as to avoid possible short circuits or overlaps.

The present invention relates to a synchronous rectification control circuit, for controlling a synchronous rectification circuit, and the synchronous rectification circuit includes a pulse width control unit comprising an output switch unit, a transformer, a rectification unit, at least one output driving unit and a rectification driving unit. The invention further comprises a signal transmission unit and a logic operation unit, and the logic operation unit receives a working cycle signal of the pulse width control unit and produces a switching signal that represents the working cycle conversion. The signal transmission unit is connected for obtaining the switching signal and sending the switching signal to the rectification driving unit of the secondary side of the transformer, and the rectification driving unit is connected to the rectification unit, such that after the rectification driving unit obtains the switching signal from the signal transmission unit, the rectification unit is turned ON or OFF. After the rectification unit changes the working conditions, the rectification driving unit produces an acknowledge signal that is transmitted to the signal transmission unit. The signal transmission unit transmits the acknowledge signal to a logic operation unit of the primary side of the transformer, so that the logic operation unit transmits the working cycle signal to an output driving unit, and the output driving unit commands the output switch unit to be turned ON or OFF according to the working cycle signal, so as to assure that the output switch unit of the primary side obtains the working cycle signal to change the working conditions, after the rectification unit of the secondary side of the transformer has changed the working conditions in advance to avoid possible short circuits or overlaps.

DETAILED DESCRIPTION OF THE PREFERRED EMBODIMENTS

The present invention will now be described in more detail hereinafter with reference to the accompanying drawings that show various embodiments of the invention.

Figure 1:
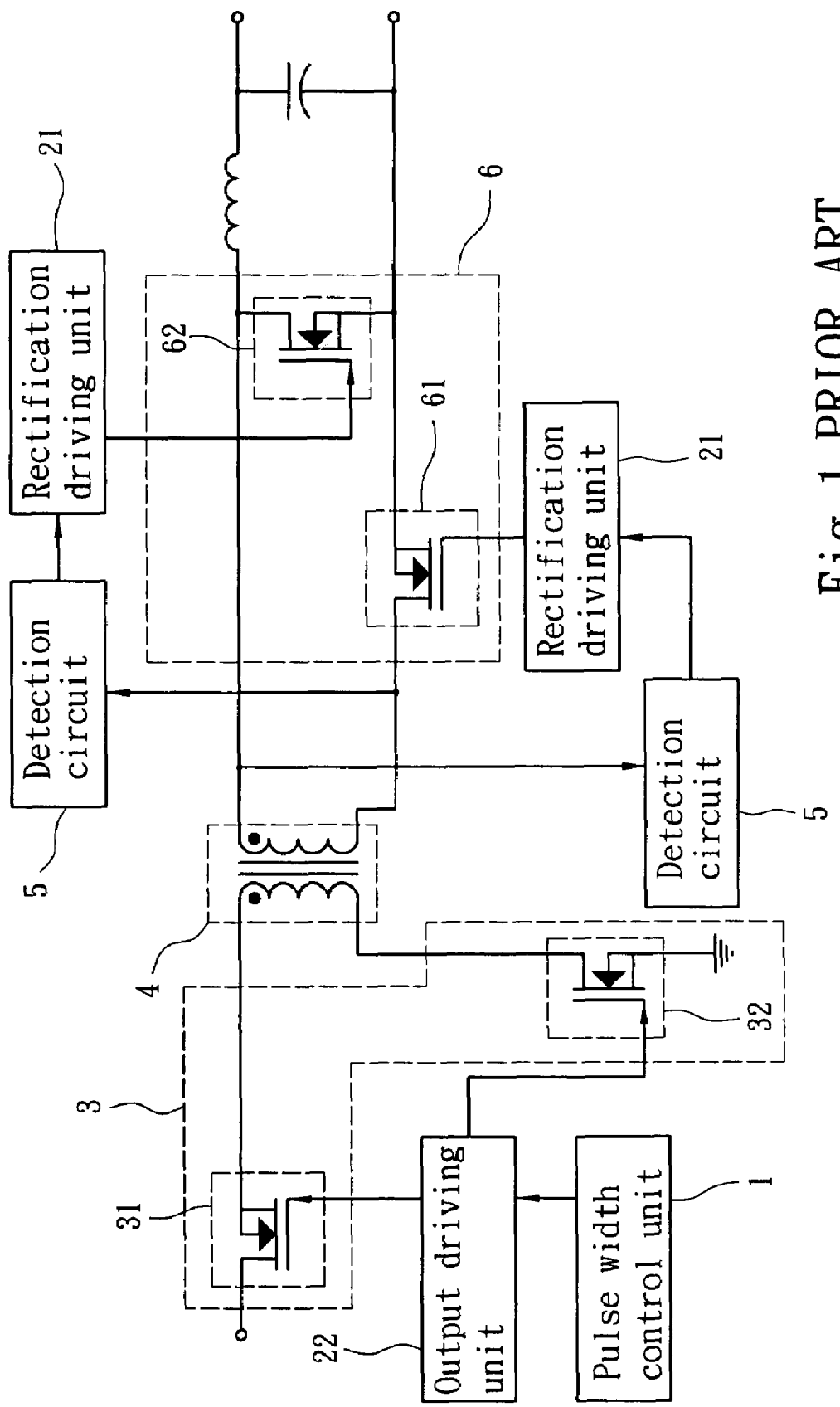
FIG. 1 is a block diagram of a conventional synchronous rectification circuit.
Figure 2:
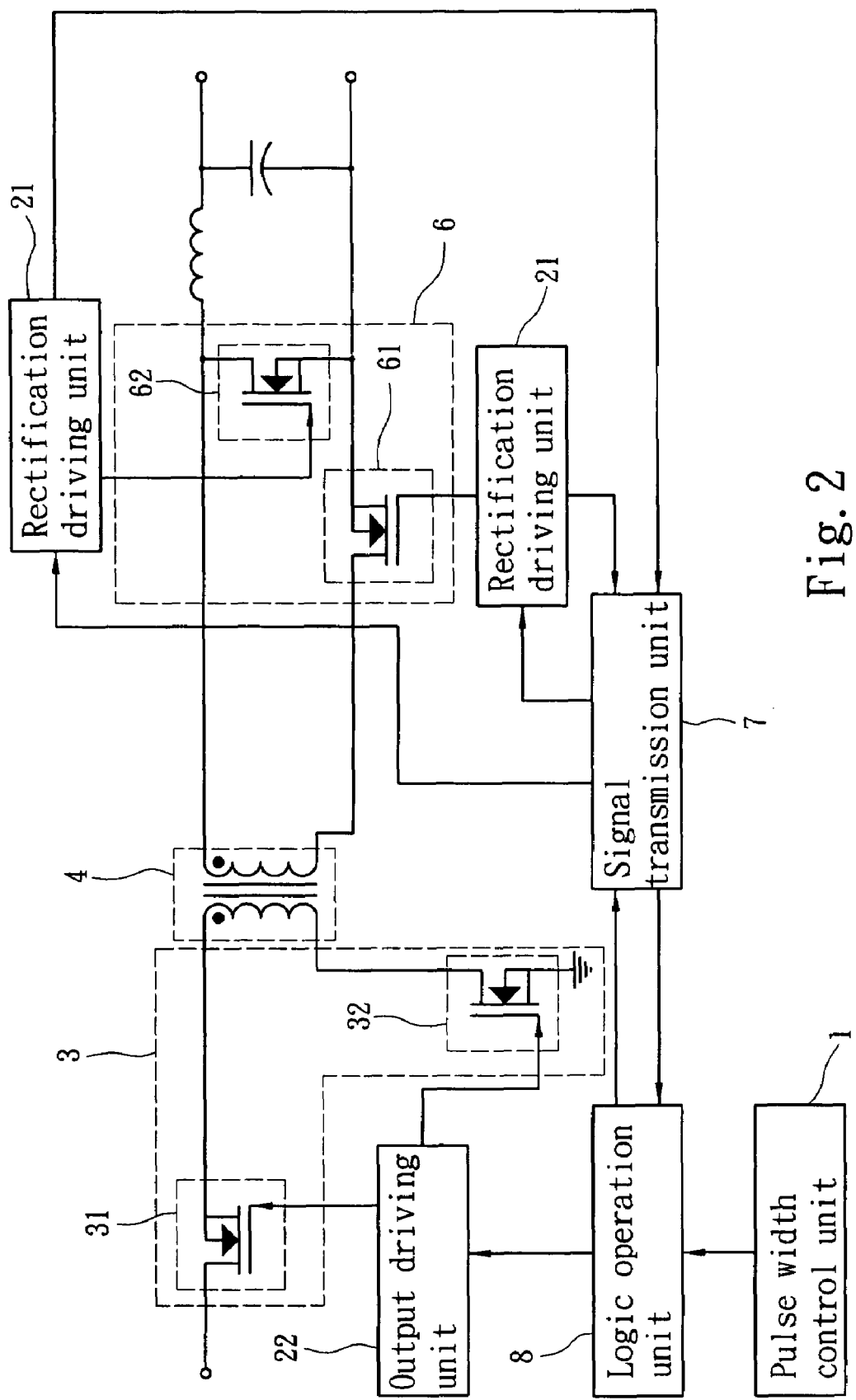
FIG. 2 is a block diagram of a preferred embodiment of the present invention.

Referring to FIG. 2 for a preferred embodiment of the present invention, the invention comprises a pulse width control unit 1, at least one rectification driving unit 21, an output driving unit 22, an output switch unit 3 composed of a first output switch 31 and a second output switch 32, a transformer 4, a rectification unit 6 composed of a first rectifier 61 and a second rectifier 62, a signal transmission unit 7 and a logic operation unit 8. The pulse width control unit 1 generates a working cycle signal, and the working cycle signal is received by a logic operation unit 8. In a working cycle conversion, the logic operation unit 8 generates a switching signal, and the logic operation unit 8 maintains the working conditions of the first output switch 31 and the second output switch 32, and transmits the switching signal to the signal transmission unit 7, and the signal transmission unit 7 is connected separately to a primary side and a secondary side of the transformer 4, and the signal transmission unit 7 adopts an optical coupling technology to transmit the switching signal from the primary side of the transformer 4 to the secondary side, and the signal transmission unit 7 transmits the switching signal to a rectification driving unit 21, and the rectification driving unit 21 controls the first rectifier 61 and the second rectifier 62 to be turned ON and OFF alternately. After the rectification driving unit 21 obtains the switching signal, working conditions of the first rectifier 61 and the second rectifier 62 are changed, and the first rectifier 61 and the second rectifier 62 have changed their working conditions, the rectification driving unit 21 generates and returns an acknowledge signal to the signal transmission unit 7, and the signal transmission unit 7 returns the acknowledge signal to the logic operation unit 8 of the primary side of the transformer 4 by the optical coupling technology, and then the logic operation unit 8 sends the working cycle signal to the output driving unit 22, and the output driving unit 22 drives the first and second output switches 31, 32 to be turned ON and OFF alternately. Since the first rectifier 61 and the second rectifier 62 of the secondary side have changed their working conditions in advance, therefore the first and second rectifiers 61, 62 are ready to operate when the first output switch 31 and second output switch 32 have changed their working conditions, so as to avoid a possible short circuit between the first and second rectifiers 61, 62.

Figure 3:
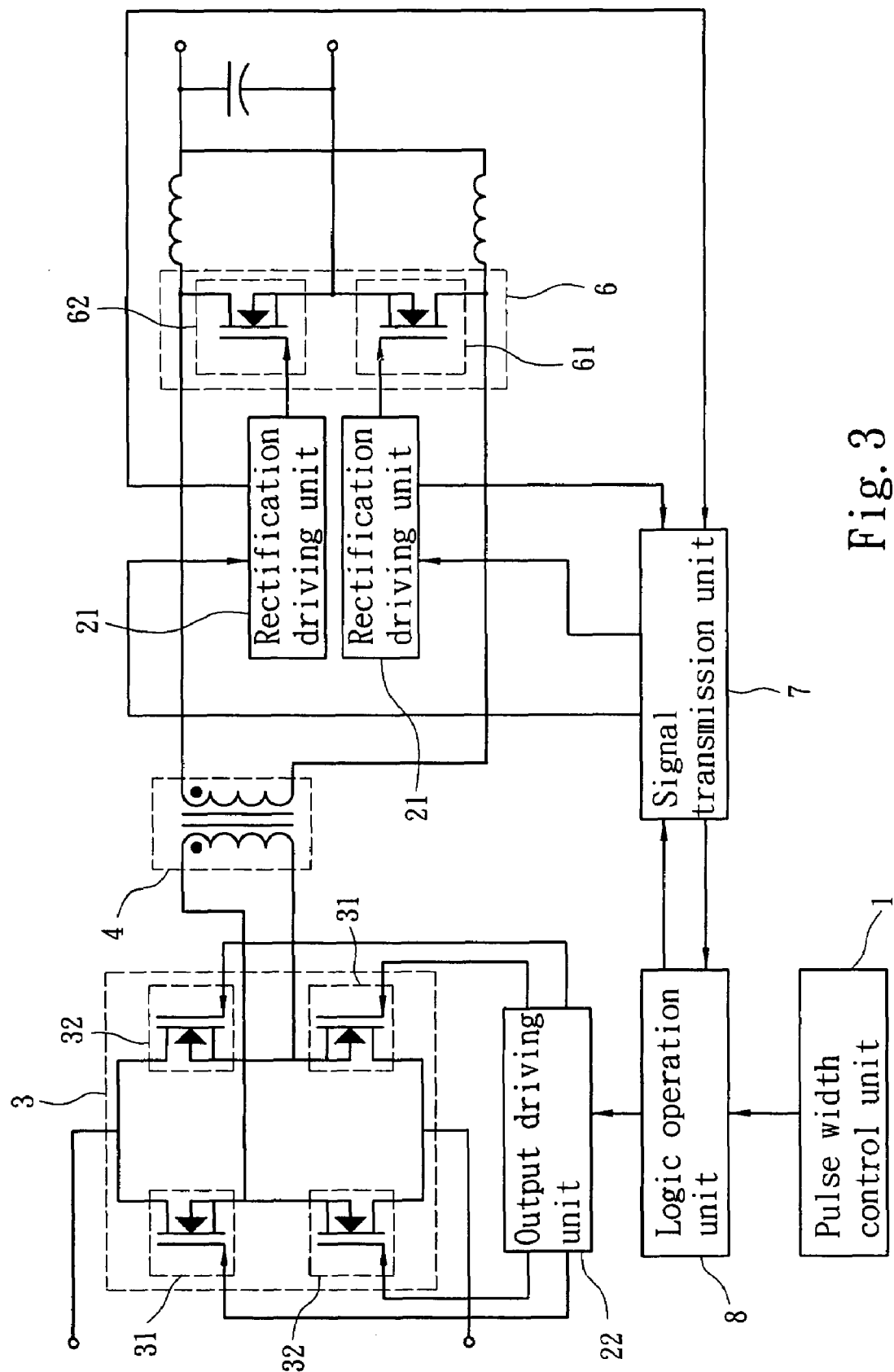
FIG. 3 is a block diagram of another preferred embodiment of the present invention.

Referring to FIG. 3 for another preferred embodiment of the present invention, the invention can use a bridge circuit, wherein the pulse width control unit 1 transmits a working cycle signal to the logic operation unit 8, and the logic operation unit 8 generates and sends a switching signal to the signal transmission unit 7, and the signal transmission unit 7 sends the switching signal to the rectification driving unit 21 of the secondary side of the transformer 4 by the optical coupling technology, and the rectification driving unit 21 drives the first and second rectifiers 61, 62 to change their working conditions, and the rectification driving unit 21 returns an acknowledge signal to a primary side through the signal transmission unit 7 by using the optical coupling technology and outputs the acknowledge signal to the logic operation unit 8, and the logic operation unit 8 transmits the working cycle signal to the output driving unit 22, and the output driving unit 22 is provided for driving a pair of first output switches 31 and a pair of second output switches 32.

The present invention is not limited to any particular type of rectification circuit, and the rectification circuit can use a driving unit to drive several switches or rectifiers simultaneously, and the output switch unit 3 or the rectification unit 6 can use one output switch or one rectifier to achieve the rectification of an output, and the output switch unit 3 and the rectification unit 6 are formed by one or more metal oxide semiconductor field effect transistors (MOSFET), and the rectification driving unit 21 controls the gate electrode voltage of the MOSFET to make sure that the first rectifier 61 and the second rectifier 62 to be turned ON or OFF. Further, the signal transmission unit 7 can use a magnetic coupling technology to transmit the switching signal and the acknowledge signal.

In summation of the description above, the present invention herein enhances over the prior art and further complies with the patent application requirements, and thus is duly applied for the patent application.

While the invention has been described by means of specific embodiments, numerous modifications and variations could be made thereto by those skilled in the art without departing from the scope and spirit of the invention set forth in the claims.

What is claimed is:

1. A synchronous rectification control circuit, including a pulse width control unit for generating a working cycle signal, and driving an output driving unit to turn on at least one output switch unit and change the electric power passing through a primary side of a transformer, and a secondary side of the transformer uses a rectification driving unit to drive at least one rectification unit and an electric power conversion circuit for an electric power conversion, wherein the synchronous rectification control circuit comprises:

a logic operation unit, for receiving the working cycle signal, and producing a switching signal;

a signal transmission unit, coupled to the logic operation unit for obtaining the switching signal, and transmitting the switching signal to a rectification driving unit of a secondary side of the transformer, and the switching signal drives the rectification driving unit to change the working conditions of the rectification unit and generates and transmits an acknowledge signal to the signal transmission unit, and the signal transmission unit transmits the acknowledge signal to a logic operation unit of the primary side of the transformer, such that the logic operation unit receives the acknowledge signal and outputs the working cycle signal to the output driving unit, and the output driving unit drives the output switch unit to be turned on or off according to the working cycle signal.

2. The synchronous rectification control circuit of claim 1, wherein the output switch unit and the rectification unit are formed by at least one MOSFET.

3. The synchronous rectification control circuit of claim 1, wherein the signal transmission unit uses an optical coupler for transmitting a signal.

4. The synchronous rectification control circuit of claim 1, wherein the signal transmission unit uses a magnetic coupler for transmitting a signal.

* * * * *